United States Patent
Shyu et al.

(12)

(10) Patent No.: US 6,201,032 B1
(45) Date of Patent: Mar. 13, 2001

(54) EVA-BASED FOAMABLE COMPOSITION AND PROCESS FOR MAKING BIODEGRADABLE EVA FOAM

(76) Inventors: Horng-Yi Shyu; Yi-Sheng Shyu, both of No. 1, Hua-Hsiu Rd., Hua-Tan Tsun, Hua-Tan, Hsiang, Changhua Hsien (TW)

( * ) Notice: Subject to any disclaimer, the term of this patent is extended or adjusted under 35 U.S.C. 154(b) by 0 days.

(21) Appl. No.: 09/626,166

(22) Filed: Jul. 26, 2000

(51) Int. Cl.$^7$ ........................................................ C08J 9/10
(52) U.S. Cl. .............................. 521/84.1; 521/95; 521/96; 521/149
(58) Field of Search ................................ 521/84.1, 95, 96, 521/149

(56) References Cited

U.S. PATENT DOCUMENTS

| | | | |
|---|---|---|---|
| 5,063,251 | * 11/1991 | Bergishagen | 521/84.1 |
| 5,258,414 | * 11/1993 | Bergishagen | 521/84.1 |
| 5,352,709 | * 10/1994 | Tarrant | 521/84.1 |
| 5,352,717 | * 10/1994 | Bergishagen | 521/84.1 |

* cited by examiner

*Primary Examiner*—Morton Foelak
(74) *Attorney, Agent, or Firm*—Foley & Lardner

(57) ABSTRACT

An EVA-based foamable composition contains an EVA resin, a foaming agent, a cross-linking agent, a lubricant, a filler, and a plant material selected from a group consisting of a starchy material, powdered grain husks, and wood shavings.

18 Claims, No Drawings

EVA-BASED FOAMABLE COMPOSITION AND PROCESS FOR MAKING BIODEGRADABLE EVA FOAM

BACKGROUND OF THE INVENTION

1. Field of the Invention

This invention relates to an EVA-based (ethylene vinyl acetate copolymer) foamable composition and a process for making a biodegradable EVA foam which can be used for the production of plastic articles, such as shoe soles, packing material, toys, medical equipment, etc.

2. Description of the Related Art

Polymers, such as polyethylene, ethylene vinyl acetate copolymer (EVA), ethylene acrylic acid copolymer, polypropylene, polystyrene, polyvinylchloride (PVC), etc., are non-biodegradable. Since large amounts of plastic wastes, which are made of these polymers, are produced each day, they have caused serious problems to the environment. These plastic wastes are very stable, and do not decompose for several decades after landfill disposal. Thus, there is a constant need for plastic materials that are biodegradable.

Starch is the most common among biodegradable components used in production of biodegradable plastics. U.S. Pat. No. 5,449,708 discloses a method for the continuous preparation of a starch-based biodegradable polymer material which contains an ethylene acrylic acid copolymer, a salt of stearic acid and an effective amount of starch. The biodegradable polymer material can be used in the formation of thin films, hollow tubing or rods, and the like. U.S. Pat. No. 4,133,784 discloses a flexible, self-supporting, and biodegradable film composition comprising a dry composite of a starchy material and a water-dispersible ethylene acrylic acid copolymer. The biodegradable film composition can be used in the formation of plastic films for packaging, such as for agricultural mulching.

However, such starch-based biodegradable polymer materials can only be used in the production of film type or tube type biodegradable plastics, and are not suitable for the production of plastic articles, such as shoe soles, packing material, toys, and medical equipment that require higher impact strength and hardness than those of the film-type or tube-type plastics.

U.S. Pat. No. 4,396,568 discloses a method for the manufacture of a relief-like profiled outer sole of a cross-linked ethylene-co-vinyl acetate (EVA) foamed with closed cells. However, the outer sole is not biodegradable.

Summary Of The Invention

Therefore, it is an object of the present invention to provide an EVA-based (ethylene vinyl acetate copolymer) foamable composition that is biodegradable.

It is another object of the present invention to provide a process for making a biodegradable EVA foam which can be used for manufacturing articles, such as shoe soles, packing material, toys, etc.

According to one aspect of the present invention, an EVA-based foamable composition comprises: an EVA resin; a foaming agent; a cross-linking agent; a lubricant; a filler; and a plant material selected from a group consisting of a starchy material, powdered grain husks, and wood shavings.

According to another aspect of the present invention, a process for making a biodegradable EVA foam comprises the steps of: blending an EVA resin, a foaming agent, a cross-linking agent, a lubricant, a filler, and a plant material selected from a group consisting of a starchy material, powdered grain husks and wood shavings in a blender at a temperature of about 90–120° C. to form an intermediate product; and thermal compression molding the intermediate product in a mold cavity at a temperature of about 160–175° C. and a pressing pressure of about 120–180kg/cm$^2$ to form a biodegradable cross-linked EVA foam.

DETAILED DESCRIPTION OF THE PREFERRED EMBODIMENT

This invention relates to an EVA-based foamable composition that can be used in the formation of a biodegradable EVA foam via thermal compression molding in a mold cavity. The thus formed biodegradable EVA foam has high impact strength and hardness such that the biodegradable EVA foam can be used in the production of biodegradable plastic articles, such as shoe soles, packing material, toys, and medical equipment.

The EVA-based foamable composition contains an EVA (ethylene vinyl acetate copolymer) resin, a foaming agent, a foam aiding agent, a cross-linking agent, a lubricant, a filler, and a plant material selected from a group consisting of a starchy material, powdered grain husks, and wood shavings.

Preferably, the starchy material employed in the composition of this invention is corn starch. The grain husks are preferably selected from a group consisting of paddy husks and nut husks, such as peanut husks, and is more preferably paddy husks. These plant materials are highly compatible with the EVA resin such that not only do they impart a biodegradable property to the EVA-based foamable composition, they can also help obtain the desired biodegradable EVA foam without sacrificing the mechanical property of the EVA foam. The amount of the aforesaid plant material employed in the EVA-based foamable composition is preferably in the range of 15–30% based on the dry weight of the EVA resin.

The filler employed in the composition of this invention is preferably calcium carbonate due to its low cost and capability of adjusting the pH value of the EVA-based foamable composition for facilitating cross-linking of the EVA-based foamable composition during the thermal compression molding. The amount of the filler employed in the EVA-based foamable composition is preferably in the range of 15–20% based on the dry weight of the EVA resin.

The lubricant employed in the composition of this invention is preferably selected from a group consisting of stearic acid and palmitic acid, and is more preferably stearic acid. The lubricant is added to the composition for making processing thereof easier and smoother. The amount of the lubricant employed in the EVA-based foamable composition is preferably in the range of 0.5–2.0% based on the dry weight of the EVA resin.

The foaming agent employed in the composition of this invention is preferably azodicarbonamide which possesses excellent dispersing effect without any adverse affect on the biodegradable EVA foam. The amount of the foaming agent employed in the EVA-based foamable composition is preferably in the range of 3–10% based on the dry weight of the EVA resin.

The foam aiding agent employed in the composition of this invention is preferably a metal oxide selected from a group consisting of ZnO, CeO, PbO, BaO, and CdO. The amount of the foam aiding agent employed in the EVA-based foamable composition is preferably in the range of 3–10% based on the dry weight of the EVA resin.

The cross-linking agent is preferably selected from a group consisting of an alkali boron hydride (lithium boron hydride), an alkali perborate (sodium perborate), an alkali persulfate (potassium persulfate), hydrogen peroxide, tert.-butyl hydroperoxide, isopropyl benzene hydroperoxide, diacetal peroxide, dipropionyl peroxide, dibenzoyl peroxide, bis(2-methylbenzoyl) peroxide, di(tert.- buytyl) peroxide, dicumyl peroxide, 2,5-di(tert.- butyl oxide)-2,5-dimethylhexane, 2,5-di(tert.- butyl peroxide)-2,5-dimethylhexane-3,2,2- bis (tert.-butylperoxy) propane, 1,1-bis(tert.- butylperoxy)-3,3,5-trimethyl cyclohexane, tert.-butyl peroxycrotonate, and tert.-butyl peroxyacetate, and is more preferably dicumyl peroxide. The amount of the cross-linking agent employed in the EVA-based foamable composition is preferably in the range of 1–5% based on the dry weight of the EVA resin.

The biodegradable EVA foam is prepared by kneading the aforementioned components of the EVA-based foamable composition in a kneader at room temperature, blending the components in a roller-type type blender at a temperature of about 90–120° C. to form an intermediate product, and thermal compression molding the intermediate product in a mold cavity at a temperature of about 160–175° C. and a pressing pressure of about 120–180kg/cm$^2$ to form a biodegradable cross-linked EVA foam.

The present invention will be described in more detail in the following Examples.

Example 1

100 parts of EVA resin were kneaded with 10.0 PHR (Part per Hundred parts of Resin) of calcium carbonate, 3.5 PHR of azodicarbonamide, 3.5 PHR of ZnO, 1.0 PHR of dicumyl peroxide, 2.0 PHR of tearic acid, and 30.0 PHR of powdered paddy husks in a kneader at room temperature for about 10 minutes. The mixture was subsequently blended in a roller-type blender at a temperature of about 90–120° C. for about 8–10 minutes to form an intermediate product. The intermediate product was then subjected to thermal compression molding in a mold cavity at a temperature of about 160–175° C. and a pressing pressure of about 150 kg/cm$^2$ for about 10–20 minutes. The intermediate product was cross-linked, and was foamed during the thermal compression molding to form a final product, i.e. the biodegradable EVA foam.

Preparations of the biodegradable EVA foams in Examples 2–12 are similar to that of Example 1, except that different compositions are employed.

Example 2

The composition prepared in this Example contains 100 parts of EVA resin, 15.0 PHR of calcium carbonate, 6.0 PHR of azodicarbonamide, 6.0 PHR of ZnO, 1.0 PHR of dicumyl peroxide, 1.5 PHR of stearic acid, and 20.0 PHR of powdered paddy husks.

Example 3

The composition prepared in this Example contains 100 parts of EVA resin, 20.0 PHR of calcium carbonate, 5.0 PHR of azodicarbonamide, 4.0 PHR of ZnO, 2.0 PHR of sodium boron hydride, 1.0 PHR of stearic acid, and 15.0 PHR of powdered paddy husks.

Example 4

The composition prepared in this Example contains 100 parts of EVA resin, 15.0 PHR of calcium carbonate, 7.0 PHR of azodicarbonamide, 7.0 PHR of BaO, 5.0 PHR of sodium perborate, 1.0 PHR of palmitic acid, and 15.0 PHR of powdered paddy husks.

Example 5

The composition prepared in this Example contains 100 parts of EVA resin, 20.0 PHR of calcium carbonate, 5.0 PHR of azodicarbonamide, 5.0 PHR of ZnO, 2.0 PHR of di(tert.-butyl) peroxide, 1.0 PHR of stearic acid, and 15.0 PHR of wood shavings.

Example 6

The composition prepared in this Example contains 100 parts of EVA resin, 15.0 PHR of calcium carbonate, 5.0 PHR of azodicarbonamide, 6.0 PHR of BaO, 2.0 PHR of diacetal peroxide, 1.0 PHR of stearic acid, and 20.0 PHR of wood shavings.

Example 7

The composition prepared in this Example contains 100 parts of EVA resin, 10.0 PHR of calcium carbonate, 3.0 PHR of azodicarbonamide, 3.0 PHR of ZnO, 3.0 PHR of diacetal peroxide, 2.0 PHR of stearic acid, and 30.0 PHR of wood shavings.

Example 8

The composition prepared in this Example contains 100 parts of EVA resin, 20.0 PHR of calcium carbonate, 5.0 PHR of azodicarbonamide, 5.0 PHR of ZnO, 1.0 PHR of dicumyl peroxide, 1.0 PHR of stearic acid, and 15.0 PHR of wood shavings.

Example 9

The composition prepared in this Example contains 100 parts of EVA resin, 20.0 PHR of calcium carbonate, 4.0 PHR of azodicarbonamide, 4.0 PHR of ZnO, 2.0 PHR of sodium boron hydride, 1.5 PHR of stearic acid, and 20.0 PHR of wood shavings.

Example 10

The composition prepared in this Example contains 100 parts of EVA resin, 20.0 PHR of calcium carbonate, 5.0PHR of azodicarbonamide, 5.0 PHR of BaO, 5.0 PHR of sodium perborate, 1.0 PHR of palmitic acid, and 15.0 PHR of powdered peanut husks.

Example 11

The composition prepared in this Example contains 100 parts of EVA resin, 15.0 PHR of calcium carbonate, 5.0 PHR of azodicarbonamide, 5.0 PHR of ZnO, 2.0 PHR of di(tert.-butyl) peroxide, 1.0 PHR of stearic acid, and 20.0 PHR of powdered peanut husks.

Example 12

The composition prepared in this Example contains 100 parts of EVA resin, 20.0 PHR of calcium carbonate, 5.0 PHR of azodicarbonamide, 5.0 PHR of ZnO, 2.0 PHR of diacetal peroxide, 1.0 PHR of stearic acid, and 15.0 PHR of corn starch.

The biodegradable EVA foams prepared in the aforementioned Examples were subjected to a decomposition test such that the decomposing time required for these biodegradable EVA foams to totally decompose can be calculated. In a case, when the biodegradable EVA foams were buried in wet soil, the calculated decomposing time for those of the biodegradable EVA foams that contain 15 PHR of the plant material was about 5 years, and for those that contain 30

PHR of the plant material was about 3 years. In another case, when the biodegradable EVA foams were buried in dry soil, the calculated decomposing time for those of the biodegradable EVA foams that contain 15 PHR of the plant material was about 5 years, and for those that contain 30 PHR of the plant material was about 4 years.

The plant material contained in the EVA foams can be decomposed by bacteria, thereby making the EVA foams biodegradable. The plant material contains lignin and cutin wax which favor the growth of the bacteria, particularly fungi. The bacteria can penetrate into and destroy the structure of the EVA foams. Moreover, the lignin and cut in wax of the plant material can make the processing of the biodegradable EVA foams smoother. It is noted that paddy husks are rich in both lignin and cutin wax.

With the invention thus explained, it is apparent that various modifications and variations can be made without departing from the spirit of the present invention. It is therefore intended that the invention be limited only as recited in the appended claims.

We claim:

1. An EVA-based foamable composition, comprising:
   an EVA resin;
   a foaming agent;
   a cross-linking agent;
   a lubricant;
   a filler; and
   a plant material selected from a group consisting of a starchy material, powdered grain husks, and wood shavings.

2. The EVA-based foamable composition of claim 1, further comprising a foam aiding agent.

3. The EVA-based foamable composition of claim 1, wherein said starchy material is corn starch.

4. The EVA-based foamable composition of claim 1, wherein said grain husks are paddy husks.

5. The EVA-based foamable composition of claim 1, wherein said filler is calcium carbonate.

6. The EVA-based foamable composition of claim 1, wherein said lubricant is selected from a group consisting of stearic acid and palmitic acid.

7. The EVA-based foamable composition of claim 1, wherein said lubricant is stearic acid.

8. The EVA-based foamable composition of claim 1, wherein said foaming agent is azodicarbonamide.

9. The EVA-based foamable composition of claim 1, wherein said cross-linking agent is selected from a group consisting of an alkali boron hydride, an alkali perborate, an alkali persulfate, hydrogen peroxide, tert.-butyl hydroperoxide, isopropyl benzene hydroperoxide, diacetal peroxide, dipropionyl peroxide, dibenzoyl peroxide, bis(2-methylbenzoyl)peroxide, di(tert.-butyl)peroxide, dicumyl peroxide, 2,5-di(tert.-butyl oxide)-2,5-dimethylhexane, 2,5-di(tert.-butyl peroxide)-2,5-dimethylhexane- 3,2,2-bis(tert.-butylperoxy)propane, 1,1-bis(tert.-butylperoxy)- 3,3,5-trimethyl cyclohexane, tert.-butyl peroxycrotonate, and tert.-butyl peroxyacetate.

10. The EVA-based foamable composition of claim 9, wherein said alkali boron hydride is lithium boron hydride.

11. The EVA-based foamable composition of claim 9, wherein said alkali perborate is sodium perborate.

12. The EVA-based foamable composition of claim 9, wherein said alkali persulfate is potassium persulfate.

13. The EVA-based foamable composition of claim 1, wherein said cross-linking agent is dicumyl peroxide.

14. The EVA-based foamable composition of claim 2, wherein said foam aiding agent is selected from a group consisting of ZnO, CeO, PbO, BaO, and CdO.

15. The EVA-based foamable composition of claim 1, wherein the amount of said foaming agent is in the range of 3–10%, the amount of said cross-linking agent is in the range of 1–5%, the amount of said filler is in the range of 15–20%, the amount of said lubricant is in the range of 0.5–2.0%, and the amount of said plant material is in the range of 15–30%, all based on the dry weight of said EVA resin.

16. The EVA-based foamable composition of claim 15, further comprising a foam aiding agent, the amount of which is in the range of 3–10% based on the dry weight of said EVA resin.

17. A process for making a biodegradable EVA foam, comprising the steps of:
   blending an EVA resin, a foaming agent, a cross-linking agent, a lubricant, a filler, and a plant material selected from a group consisting of a starchy material, powdered grain husks and wood shavings in a blender at a temperature of about 90–120° C. to form an intermediate product; and
   thermal compression molding said intermediate product in a mold cavity at a temperature of about 160–175° C. and a pressing pressure of about 120–180kg/cm$^2$ to form a biodegradable cross-linked EVA foam.

18. The process of claim 17, wherein the amount of said foaming agent is in the range of 3–10%, the amount of said foam aiding agent is in the range of 3–10%, the amount of said cross-linking agent is in the range of 1–5%, the amount of said filler is in the range of 15–20%, the amount of said lubricant is in the range of 0.5–2.0%, and the amount of said plant material is in the range of 15–30%, all based on the dry weight of said EVA resin.

* * * * *